Figure 1:
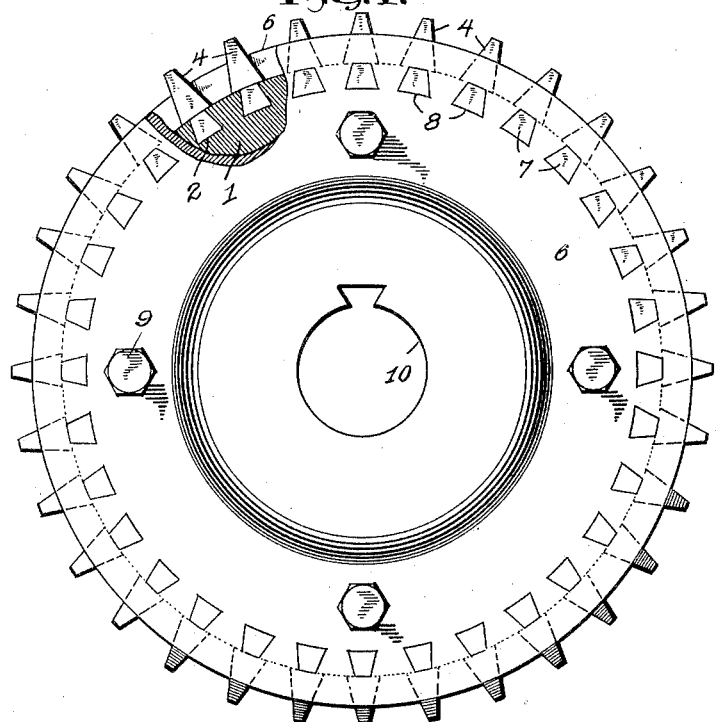

A. S. FINCH.
GEAR WHEEL.
APPLICATION FILED MAY 24, 1913.

1,081,104.

Patented Dec. 9, 1913.

WITNESSES

INVENTOR
Arthur S. Finch
BY
ATTORNEYS

UNITED STATES PATENT OFFICE.

ARTHUR S. FINCH, OF PASSAIC, NEW JERSEY.

GEAR-WHEEL.

1,081,104.　　　　　Specification of Letters Patent.　　　Patented Dec. 9, 1913.

Application filed May 24, 1913. Serial No. 769,592.

*To all whom it may concern:*

Be it known that I, ARTHUR S. FINCH, a citizen of the United States, and a resident of Passaic, in the county of Passaic and State of New Jersey, have invented a new and Improved Gear-Wheel, of which the following is a full, clear, and exact description.

This invention relates to the general class of machine elements and has to do particularly with gear wheels of that class in which the teeth are separate from the body of the gear wheel and inserted in the periphery thereof.

The invention has for its general objects to improve and simplify the construction of gear wheels of the type referred to so as to be comparatively simple and inexpensive to manufacture, reliable and efficient in use and so designed that a tooth can be readily removed when worn or broken so as to provide for the insertion of a new tooth. Such gear wheel is particularly advantageous when used in automobile gearing and the like, as the stripping of the teeth of gear wheels is quite common, causing considerable annoyance and delay, as it is usually necessary to send to the manufacturers for a new gear wheel, as local agencies do not ordinarily carry gear wheels in stock. Consequently, a car is thrown out of commission for a long time when a new gear wheel is to be installed. Furthermore, much inconvenience is caused by the stripping of gear teeth when the vehicle is out on the road, commonly necessitating the towing of the automobile to a place of repair. With the present invention these objections are overcome, as each automobile user can keep a sufficient stock of insertible teeth on hand for ready use at any time. Of course it is to be understood that gear wheels constructed in accordance with the present invention are used in other connections than with automobiles, as in fact all machinery having gear teeth that are subjected to severe use may be equipped with gear wheels having insertible teeth, as herein proposed.

More specifically, the purpose of the invention is to provide a gear wheel having gear teeth dove-tailed removably in the periphery of the body of the wheel with base extensions which are adapted to engage in openings in plates applied to the sides of the body of the wheel, whereby the said plates hold the gear teeth against lateral displacement and also afford additional securing and strengthening means for the teeth.

With these objects in view, and others as will appear as the description proceeds, the invention comprises various novel features of construction and arrangement of parts which will be more fully described hereinafter and set forth with particularity in the claims appended hereto.

Figure 2:
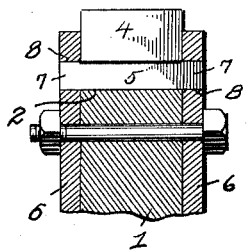
Figure 5:
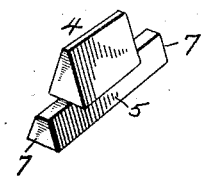
Figure 3:
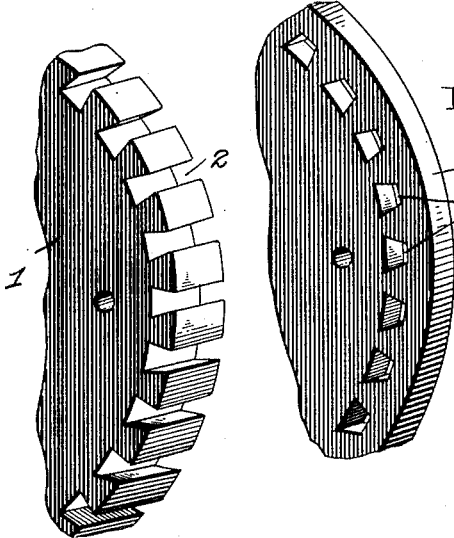
Figure 4:
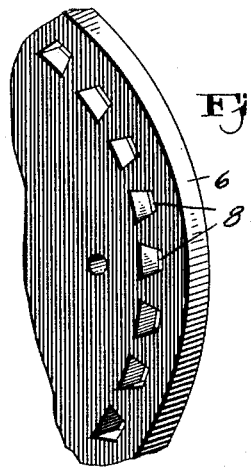

In the accompanying drawings, which illustrate one embodiment of the invention, and wherein similar reference characters are employed to designate corresponding parts throughout the several views, Figure 1 is a side view of the gear wheel with a portion broken away to show the manner of inserting the gear teeth; Fig. 2 is a fragmentary perspective view of the peripheral portion of the body of the wheel; Fig. 3 is a similar view of one of the side plates; Fig. 4 is a perspective view of one of the insertible teeth; and Fig. 5 is a detail sectional view taken radially through the outer portion of the gear wheel.

Referring to the drawing, 1 designates the body of the gear wheel, which is in the form of a circular plate, disk or the like having in its periphery spaced dove-tailed grooves 2 that extend parallel with the axis and from one side to the other. While the grooves or slots 2 are preferably dove-tailed in cross-section it is to be understood that any other shape may be employed as long as undercut or overhanging shoulders are employed so as to firmly anchor the teeth 4 in the body. Each tooth, which may be of any desired shape, has a base or root 5 that is of such cross-section as to snugly fit in a slot or groove 2, whereby the teeth when inserted into the body 1 of the wheel are held against detachment in a radial direction. To hold the teeth from displacement laterally of the wheel or longitudinally of the slots two side plates or rings 6 are applied to the sides of the body 1 to overlie the ends of the gear teeth 4, said plates 6 being of larger diameter than the body 1. In order to considerably strengthen the gear teeth and provide a more durable and rigid construction the base or root 5 of each tooth has a lateral extension 7 at each end, and these extensions are adapted to engage in openings 8 in the side plate 6, said root extension 7 being in the same plane with the root 5 and consequently the openings 8 are disposed inwardly from the peripheral surface of each plate 6.

In assembling the parts the teeth 4 are inserted in the slots 2 of the body 1, with the base extension 7 of the teeth extending from both sides of the body 1, and then the side plates 6 are placed in position at opposite sides of the body 1 and with the base extension 7 of the teeth entering the openings 8. The plates 6 and 7 are then clamped together in any suitable manner, as for instance, by bolts 9, as clearly shown in Fig. 5. A central opening 10 is provided in the gear wheel when desired for connection with a shaft or equivalent machine element. With a construction of this character it is an easy matter to take out a worn or broken gear tooth, as it is merely necessary to remove one of the side plates and extract the tooth by pulling thereon in a direction parallel with the base, and thereupon a new tooth can be inserted in the vacant slot 2 and the plates 6 replaced and bolted.

From the foregoing description taken in connection with the accompanying drawings, the advantages of the method of operation and of the device shown will be readily understood by those skilled in the art to which the invention appertains, and while I have described the device which I now consider to be the best embodiment thereof, I desire to have it understood that the device shown is merely illustrative and that such changes may be made when desired as are within the scope of the appended claims.

Having thus described my invention I claim as new and desire to secure by Letters Patent:

1. A gear wheel of the class described comprising a body having slots in its periphery, teeth in the said slots and having base extensions projecting from opposite sides of the body, and side plates secured to the said body and having openings for receiving the base extensions of the teeth.

2. A gear wheel of the class described comprising a body having in its periphery dove-tailed slots extending from one side to the other, gear teeth having dove-tailed bases slidable into the said slots, the bases being longer than the teeth to form base extensions at opposite ends of the latter, and devices secured to opposite sides of the body and having means for receiving the said base extensions of the teeth.

In testimony whereof I have signed my name to this specification in the presence of two subscribing witnesses.

ARTHUR S. FINCH.

Witnesses:
CHATTEN BRADWAY,
PHILIP D. ROLLHAUS.

---

Copies of this patent may be obtained for five cents each, by addressing the "Commissioner of Patents, Washington, D. C."